(12) United States Patent
Pudney et al.

(10) Patent No.: US 10,184,687 B2
(45) Date of Patent: Jan. 22, 2019

(54) HOT WATER STORAGE DEVICE (71) Applicant: MaxHeat Hot Water Pty Ltd, Gorokan, NSW (AU)

(72) Inventors: John Pudney, Gorokan (AU); Hugh Stark, Kareela (AU)

(73) Assignee: MaxHeat Hot Water Pty Ltd, Gorokan, NSW (AU)

( * ) Notice: Subject to any disclaimer, the term of this patent is extended or adjusted under 35 U.S.C. 154(b) by 0 days.

(21) Appl. No.: 15/519,935

(22) PCT Filed: Oct. 28, 2015

(86) PCT No.: PCT/AU2015/050672
§ 371 (c)(1),
(2) Date: Apr. 18, 2017

(87) PCT Pub. No.: WO2016/065418
PCT Pub. Date: May 6, 2016

(65) Prior Publication Data
US 2017/0350619 A1 Dec. 7, 2017

(30) Foreign Application Priority Data
Oct. 28, 2014 (AU) .................. 2014904312

(51) Int. Cl.
*F24H 1/18* (2006.01)
*F28D 20/00* (2006.01)
(Continued)

(52) U.S. Cl.
CPC ........... *F24H 1/181* (2013.01); *B29C 65/562* (2013.01); *B29C 66/52296* (2013.01);
(Continued)

(58) Field of Classification Search
CPC ........ F24H 1/181; F24H 9/2021; F24H 1/188; C08L 77/10; B65D 1/48; F16L 33/28; F16L 15/003; F16L 15/004
(Continued)

(56) References Cited

U.S. PATENT DOCUMENTS 1,607,152 A 11/1926 Eggleston
2,054,791 A 9/1936 Del Mar
(Continued)

FOREIGN PATENT DOCUMENTS

AU 1987067436 A 7/1987
AU 2004216576 B2 4/2005
(Continued)

OTHER PUBLICATIONS

Examination Report issued in corresponding AU Application No. 2015337799 dated Aug. 28, 2017 (6 pages).
(Continued)

*Primary Examiner* — Kareen K Thomas
(74) *Attorney, Agent, or Firm* — Carter, DeLuca, Farrell & Schmidt, LLP (57) ABSTRACT

A hot water storage device having a vessel includes a first section formed from a molded material and a second section formed from a molded material. An open end of the first section is sealingly engaged with an opposing open end of the second section to form the vessel. The first and second sections each have a generally cylindrical body portion and a closed end, comprising a head portion. The vessel includes a water inlet aperture molded into the first or second section and a water outlet aperture molded into the first or second section and wherein the inlet and outlet apertures are located on the body portion proximal to a tangent line between the body portion and the head portion.

18 Claims, 6 Drawing Sheets

(51) Int. Cl.

| | |
|---|---|
| *B29C 65/00* | (2006.01) |
| *F24H 1/20* | (2006.01) |
| *F24H 9/14* | (2006.01) |
| *B65D 1/48* | (2006.01) |
| *C08L 77/10* | (2006.01) |
| *F16L 15/00* | (2006.01) |
| *F16L 33/28* | (2006.01) |
| *F24H 9/20* | (2006.01) |
| *B29C 65/56* | (2006.01) |
| *B29L 31/00* | (2006.01) |

(52) U.S. Cl.
CPC ........ *B29C 66/52298* (2013.01); *B29C 66/54* (2013.01); *B29C 66/5432* (2013.01); *B65D 1/48* (2013.01); *C08L 77/10* (2013.01); *F16L 15/003* (2013.01); *F16L 15/004* (2013.01); *F16L 33/28* (2013.01); *F24H 1/188* (2013.01); *F24H 1/201* (2013.01); *F24H 9/14* (2013.01); *F24H 9/2021* (2013.01); *F28D 20/0034* (2013.01); *B29C 65/561* (2013.01); *B29C 66/71* (2013.01); *B29C 66/7212* (2013.01); *B29L 2031/7154* (2013.01); *F28D 2020/0069* (2013.01); *F28F 2230/00* (2013.01); *F28F 2255/14* (2013.01); *F28F 2275/08* (2013.01); *Y02E 60/142* (2013.01)

(58) Field of Classification Search
USPC ......... 220/565–567.3, 4.04–4.17, 4.28–4.34, 220/581–592
See application file for complete search history.

(56) References Cited

U.S. PATENT DOCUMENTS

| | | | |
|---|---|---|---|
| 2,834,865 A | 5/1958 | Coates | |
| 3,524,475 A | 8/1970 | Kirk, Jr. | |
| 4,874,104 A | 10/1989 | Klammer et al. | |
| 4,892,702 A | 1/1990 | Vignes | |
| 4,982,856 A | 1/1991 | Stokes | |
| 5,522,523 A | 6/1996 | Nogles | |
| 5,555,997 A | 9/1996 | Nogles | |
| 5,721,758 A * | 2/1998 | Fife | G21C 13/02 376/294 |
| 5,923,819 A | 7/1999 | Ross et al. | |
| 6,426,986 B1 * | 7/2002 | Fife | G21C 13/02 220/669 |
| 6,628,894 B2 | 9/2003 | Winter et al. | |
| 8,293,849 B2 * | 10/2012 | Mochizuki | H01L 33/56 525/478 |
| 2008/0128526 A1 | 6/2008 | Otake et al. | |
| 2012/0211002 A1 | 8/2012 | Humphreys | |
| 2014/0054888 A1 * | 2/2014 | Myers | F16L 19/0218 285/332 |

FOREIGN PATENT DOCUMENTS

| | | |
|---|---|---|
| CA | 2008667 A1 | 3/1994 |
| DE | 102004020822 A1 | 10/2005 |
| EP | 1533252 A2 | 5/2005 |
| EP | 2244047 A1 | 10/2010 |
| GB | 121302 A | 12/1918 |
| NZ | 280672 A | 2/1997 |
| WO | 2010/065985 A1 | 6/2010 |
| WO | 2010/097566 A1 | 9/2010 |

OTHER PUBLICATIONS

Examination Report issued in corresponding AU Application No. 2015337799 dated Oct. 23, 2017 (5 pages).
Examination Report issued in corresponding AU Application No. 2015337799 dated Nov. 17, 2017 (5 pages).
Supplementary Partial European Search Report issued in corresponding Application No. EP 15 85 5207 dated Oct. 8, 2017 (4 pages).
Rinnai Flowmaster Electric Storage Hot Water Systems Brochure.
Dux Electric Water Heaters; Hot Water Solutions Product Guide (ProFlo Series) Brochure.
Rheem; RheemPlus Solutions Brochure.
International Search Report for International Application No. PCT/AU2015/050672 dated Feb. 4, 2016.

* cited by examiner

HOT WATER STORAGE DEVICE

CROSS REFERENCE TO RELATED APPLICATIONS

This application is a national stage application of International Application No. PCT/AU2015/050672, filed Oct. 28, 2015, which claims the benefit of and priority to Australian Patent Application No. 2014904312 filed Oct. 28, 2014, the entire contents of each of which are hereby incorporated by reference.

TECHNICAL FIELD

The present disclosure relates to a hot water storage device, such as those used in a residential, commercial or industrial hot water system, and their method of construction.

BACKGROUND

Common hot water systems typically comprise at least one tank which stores water and is associated with a heating system, such as an electric heating element, a gas heater, a heat pump, or a solar heater, which heats the water for storage in the tank. The heating system may be incorporated into the tank, heating the water internally of the tank, or may be in fluid communication with the tank, heating the water externally of the tank and feeding the heated water into the tank.

In both domestic and industrial hot water systems, the hot water storage tank is typically constructed primarily of metal, such as steel. Over time the metal corrodes leading to pollution of the water in the tank in the short term and ultimately, leading to failure of the tank in the medium term. Due to corrosion and operational stresses, many hot water storage tanks need to be replaced after only a few years of use, resulting in a recurring cost to the consumer and a significant amount of waste material when a disused tank is discarded.

Common hot water heater tanks are manufactured from welded steel having a corrosion resistant lining of vitreous enamel or copper applied after fabrication, a complex and expensive manufacturing process. The high level, and cyclic nature, of the stresses applied to the tank in operation, due to fluctuations in both temperature and pressure, cause cracking of the lining, particularly at seams between the various components of the fabricated shell. Additionally, over time, with the effect of higher temperatures the vitreous enamel will ultimately dissolve into the water. Where the enamelling process has not been successful during manufacture, this dissolution can be accelerated and lead to premature failure of the tank.

Accordingly, such hot water heater tanks commonly fail by corrosion, frequently after less than ten or twelve years' service. While anodic protection can assist in restraining the corrosion process, it is reliant on the provision of appropriate maintenance by the consumer, which is frequently not provided. The corrosion problem can be addressed by the use of stainless steel however this has the disadvantage of substantially increasing the raw material costs and can only be successfully used in areas where the potable water quality is maintained within relatively tight parameters.

Steel manufacture itself is highly energy intensive and creates a large carbon footprint, making it an unattractive construction material from an environmental standpoint. As a result, the environmental credentials of steel hot water tanks are poor, since the overall manufacturing process involves a large amount of energy use and creates a large carbon footprint.

Once manufactured, metal tanks are also quite heavy and cumbersome, making them difficult to handle and expensive to transport. Heavy and cumbersome tanks are difficult for a tradesperson to install and often require a team of installers and/or machinery to lift and install the tanks.

While metal tanks have good strength characteristics, metals are particularly good conductors of heat. In order to satisfy the statutory maximum permissible heat loss requirements, it is therefore necessary for a metal tank to have thicker insulation than would be the case if the tank was constructed of a poor heat conducting material. Thicker insulation has the disadvantages of greater weight, size and cost of the finished water tank.

Polymer resin moulded water tanks, such as polyethylene rainwater tanks, are commonly used to store water and chemicals at ambient temperatures and pressures. However, these tanks are not suitable for storing heated and pressurised water such as the hot water in a domestic or commercial/industrial hot water system. Typical polymer tanks would deform and ultimately fail, due to the operating temperatures, pressures, stresses and strains to which a typical hot water tank is subjected in ordinary use.

Thus, a need exists to provide a lightweight, strong, durable and energy saving storage solution for hot water systems.

The above discussion of the prior art in the background of the invention is not an admission that any information discussed therein is citable prior art or part of the common general knowledge of persons skilled in the art in any country.

SUMMARY

In a first aspect, the present disclosure provides a hot water storage device having a vessel comprising:
a first section formed from a moulded material; and
a second section formed from a moulded material,
wherein an open end of the first section is sealingly engaged with an opposing open end of the second section to form the vessel;
wherein the first and second sections each have a generally cylindrical body portion and a closed end comprising a head portion; and
wherein the vessel includes a water inlet aperture moulded into the first or second section and a water outlet aperture moulded into the first or second section and wherein the inlet and outlet apertures are located on the body portion proximal to a tangent line between the body portion and the head portion.

Preferably, each of the apertures is centred in a circumferential region of the respective first or second section that is subject to circumferential compressive membrane stress under typical operational conditions of cyclical temperature and pressure.

Further preferably, for each aperture, a ratio of a distance between a centre of the aperture and the open ends and a distance between the tangent line and the open ends is not less than 0.90. Most preferably, the ratio is between 0.94 and 0.97.

An annular elastomeric seal is preferably arranged between the opposing open ends.

In a preferred embodiment, a heating element aperture is provided in either the first section or the second section, the heating element aperture being threaded and adapted to receive a flanged and threaded mounting component and a heating element assembly mounted to the mounting component, the heating element assembly having a heating element that extends into the vessel for heating water in the vessel.

Preferably, at least one aperture is connected to an internal conduit having an intake opening at a location above the at least one aperture.

In a preferred embodiment, the internal conduit has a valve opening generally aligned with the at least one aperture, allowing the at least one aperture to receive a valve, the valve opening having a resiliently deformable closure, adapted to close the valve opening when the at least one aperture is not used to receive a valve.

The first section and second section are preferably maintained in sealing engagement by a collar connector that clamps the opposing open ends of the first and second sections together.

In a preferred embodiment:

the first section has one or more radially outwardly projecting ribs proximal to the open end of the first section;

the second section has one or more radially outwardly projecting ribs proximal to the open end of the second section; and the collar connector has a corresponding groove adapted to receive each rib, when the collar connector clamps onto the opposing open ends.

Preferably, the grooves in the collar connector and/or the ribs of the first and second sections are tapered such that as the collar connector tightens around the opposing open ends and the ribs are pressed into the grooves, the opposing open ends are compressed together.

Further preferably, the collar connector is formed from two substantially semi-annular halves joined by at least one fastener to fasten the collar connector around the opposing open ends.

Optionally, the at least one fastener comprises one or more bolts.

In a preferred embodiment, the first section is formed from a moulded fibre reinforced polyphthalamide resin and the second section is formed from a moulded fibre reinforced polyphthalamide resin.

Preferably, the collar connector is formed from the same polyphthalamide resin as the first and second sections.

In a second aspect, the present disclosure provides a hot water storage device having a moulded polymer vessel with walls that are formed from a moulded fibre reinforced polyphthalamide resin.

In a preferred embodiment, the fibre reinforced polyphthalamide resin contains glass fibres.

Preferably, the polyphthalamide resin is formed from a mixture of hexamethylene diamine, 2-methyl pentamethylene diamine and terephthalic acid.

In a third aspect, the present disclosure provides a hot water system comprising:

a water heating device;

a hot water storage device according to the first or second aspect;

water inlet pipework in fluid communication with the storage device; and water outlet pipework in fluid communication with the storage device.

In a fourth aspect, the present disclosure provides a hot water storage device having a vessel comprising:

a first section formed from a moulded material;

a second section formed from a moulded material; and one or more third sections formed from a moulded material, wherein the first and second sections each have a generally cylindrical body portion and a closed end comprising a head portion and the one or more third portions are generally cylindrical having two open ends;

wherein the one or more third sections are arranged axially between the first section and the second section, with the open ends of adjacent sections sealingly engaged to form the vessel, and wherein the vessel includes a water inlet aperture moulded into the first or second section and a water outlet aperture moulded into the first or second section and wherein the inlet and outlet apertures are located on the body portion proximal to a tangent line between the body portion and the head portion.

Other aspects of the present disclosure are also provided.

BRIEF DESCRIPTION OF THE DRAWINGS

One or more embodiments of the present disclosure will now be described by way of specific example(s) with reference to the accompanying drawings, in which.

DETAILED DESCRIPTION

The present disclosure provides a hot water storage device 10 having a main vessel 20 with walls that are formed entirely from moulded plastic, embodiments of which are depicted in FIGS. 1 to 7. In the preferred embodiment, the main vessel 20 of the hot water storage device 10 is moulded from a fibre reinforced polyphthalamide (PPA) resin. The fibres are preferably glass fibres and the PPA resin is preferably formed from a mixture of hexamethylene diamine, 2-methyl pentamethylene diamine and terephthalic acid. This creates a resin that is able to be injection moulded into a vessel that is lightweight, strong and durable in wet and high temperature environments. Such an injection mouldable resin results in a greatly reduced need for labour during manufacture compared to the fabricated internally coated existing steel vessels.

In one particularly preferred embodiment, the main vessel 20 of the hot water storage device 10 is moulded from a glass fibre reinforced PPA resin product produced by chemical company DuPont under the trade mark Zytel™ HTN. However, other PPA resins with similar characteristics may be used. Preferably, the weight percentage of glass fibres in the PPA resin is in the range 30% to 40% and further preferably, is approximately 35%. A particularly preferred product from the Zytel™ range is Zytel™ HTN51G35HSLR BK420.

The main vessel 20 of the storage device 10 comprises a first section 100 and a second section 200, each being moulded from a fibre reinforced polyphthalamide resin. The first section 100 has a generally cylindrical body portion 102 with an open end 104 and a generally dome-shaped head portion 106. The second section 200 similarly has a generally cylindrical body portion 202 with an open end 204 and a generally dome-shaped head portion 206. The generally dome-shaped head portions 106, 206 are preferably in the form of a standard 2:1 ellipsoidal head. The juncture between the body portions 102, 202 and the respective head portions 106, 206 is called the tangent line 105, 205. The first and second sections 100, 200 are typically formed by injection moulding and accordingly, the generally cylindrical body portions 102, 202 are preferably slightly frusto-conical to facilitate removal from the moulding dies.

The first and second sections 100, 200 are joined at their open ends 104, 204 by a connector 30. The connector 30 comprises a generally annular collar that can be releasably tightened around the joined open ends 104, 204 of the first and second sections 100, 200. A first seal 40, being a self-energising elastomeric seal such as an O-ring, is arranged between the open ends 104, 204 of the first and second sections 100, 200 and the collar connector 30 is tightened to compress the seal 40 between the two open ends 104, 204. In one embodiment depicted in detail in FIG. 2 and FIG. 3, the collar connector 30 comprises two semi-annular halves 32, 34 that are held together by collar bolts 36. The two semi-annular halves 32, 34 are preferably clamped together and the collar bolts 36 tightened to tighten the collar connector 30 around the open ends 104, 204 of the first and second sections 100, 200, thereby maintaining the two halves 32, 34 together.

Figure 2:
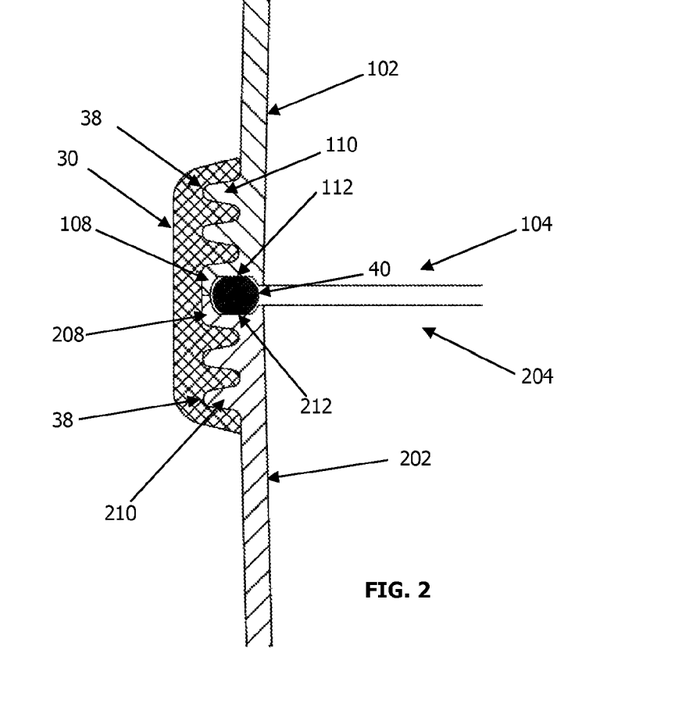
FIG. 2 is a partial cross-sectional view of the hot water storage device of FIG. 1.
Figure 3:
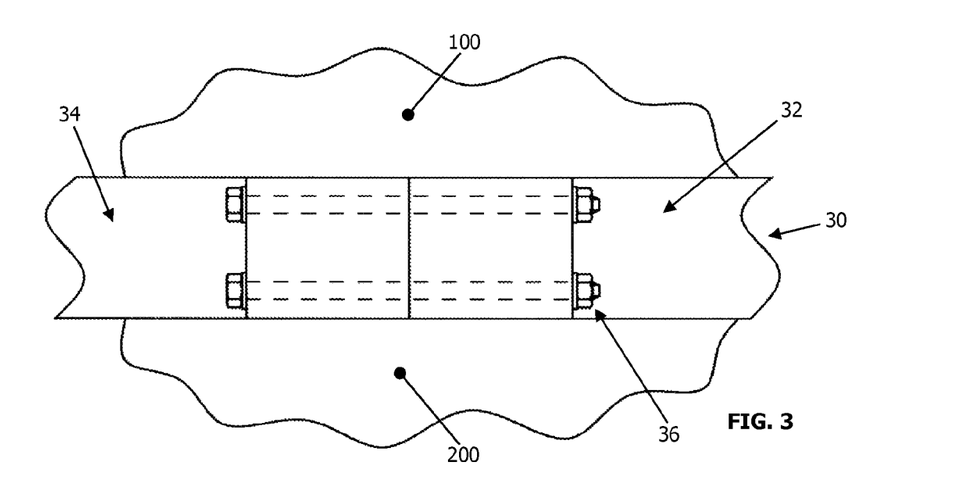
FIG. 3 is a detail view of a portion of the hot water storage device of FIG. 1.

As shown in greater detail in FIG. 2, the open ends 104, 204 of the first and second sections 100, 200 are each provided with a circumferential sealing flange 108, 208 and one or more tapered circumferential ribs 110, 210 projecting radially outwardly from the cylindrical body 102, 202 of the first and second sections 100, 200. The sealing flanges 108, 208 each have an annular groove 112, 212 for receiving the first seal 40. The collar connector 30 is formed with tapered circumferential grooves 38 that correspond to, and are adapted to mate with, the circumferential ribs 110, 210 of the first and second sections 100, 200.

In order to sealingly join the first and second sections 100, 200, a pneumatic ram is used to compress the open ends 104, 204 together, with the first seal 40 arranged between the opposing annular grooves 112, 212. The collar connector 30 is then arranged around the open ends 104, 204, with the circumferential ribs 110, 210 received in the circumferential grooves 38, and tightened via the collar bolts 36. This tightening of the collar connector 30 drives the tapered circumferential ribs 110, 210 further into the tapered circumferential grooves 38 and urges the sealing flanges 108, 208 into sealing engagement with each other.

The collar connector 30 is typically moulded from the same reinforced polyamide resin as the first and second sections 100, 200, so that they have the same thermal expansion and elasticity characteristics.

Other embodiments may include a screw thread on the first and second sections 100, 200 instead of the circumferential ribs 110, 210 and a corresponding screw thread on the collar connector 30 instead of the circumferential grooves 38. In alternative embodiments, the collar connector 30 may be omitted and the first and second sections 100, 200 may be sealingly joined via corresponding internal and external threads, via a welded connection, or via other sealingly fastening elements.

Figure 1:
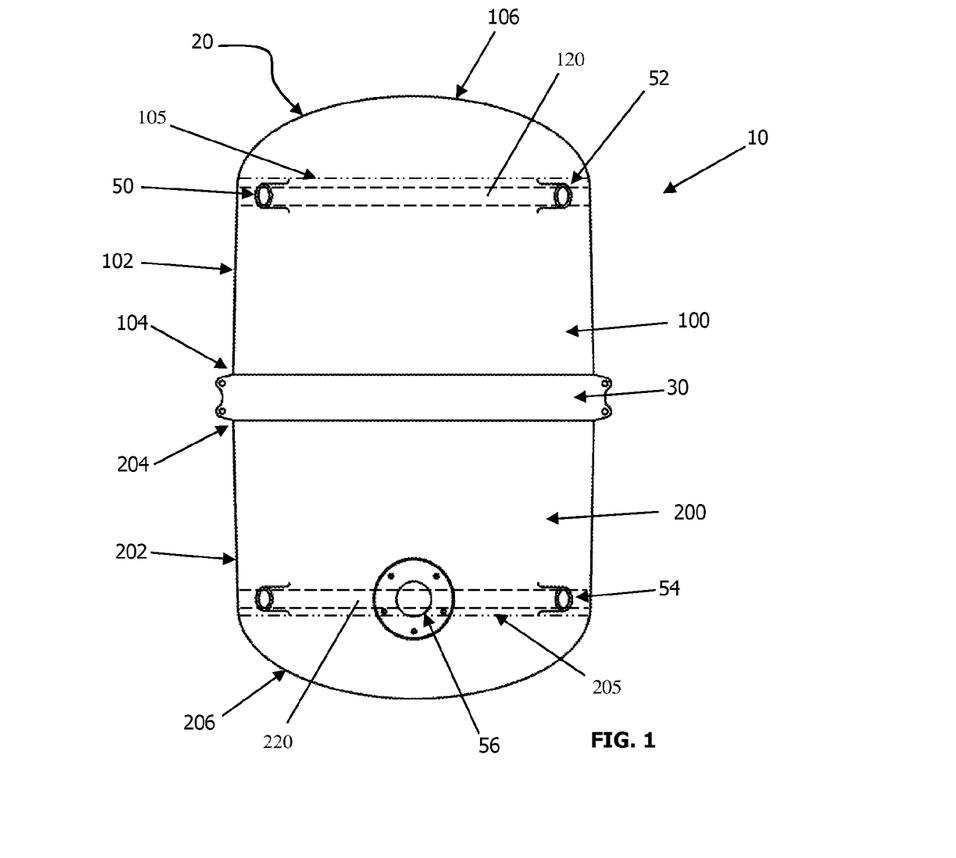
FIG. 1 depicts a hot water storage device.

In FIG. 1, the first section 100 is depicted having a valve aperture 50 near the first section head portion 106 for mounting a pressure and temperature relief valve (PTR valve). The first section 100 is also depicted having an outlet aperture 52 near the first section head portion 106 to provide a connection to water outlet pipework (not shown). Preferably, the outlet aperture 52 draws hot water from a top water level inside the first section 100. This can be achieved via a conduit 70, depicted in FIG. 7, inside the first section 100 that connects the outlet aperture 52 to the top water level inside the first section 100.

The second section 200 is depicted having an inlet aperture 54 near the second section head portion 206 to provide a connection to water inlet pipework. The second section 200 is also depicted having a heating element aperture 56 near the second section head portion 206 for mounting an electrical heating element and thermostat.

Figure 4:
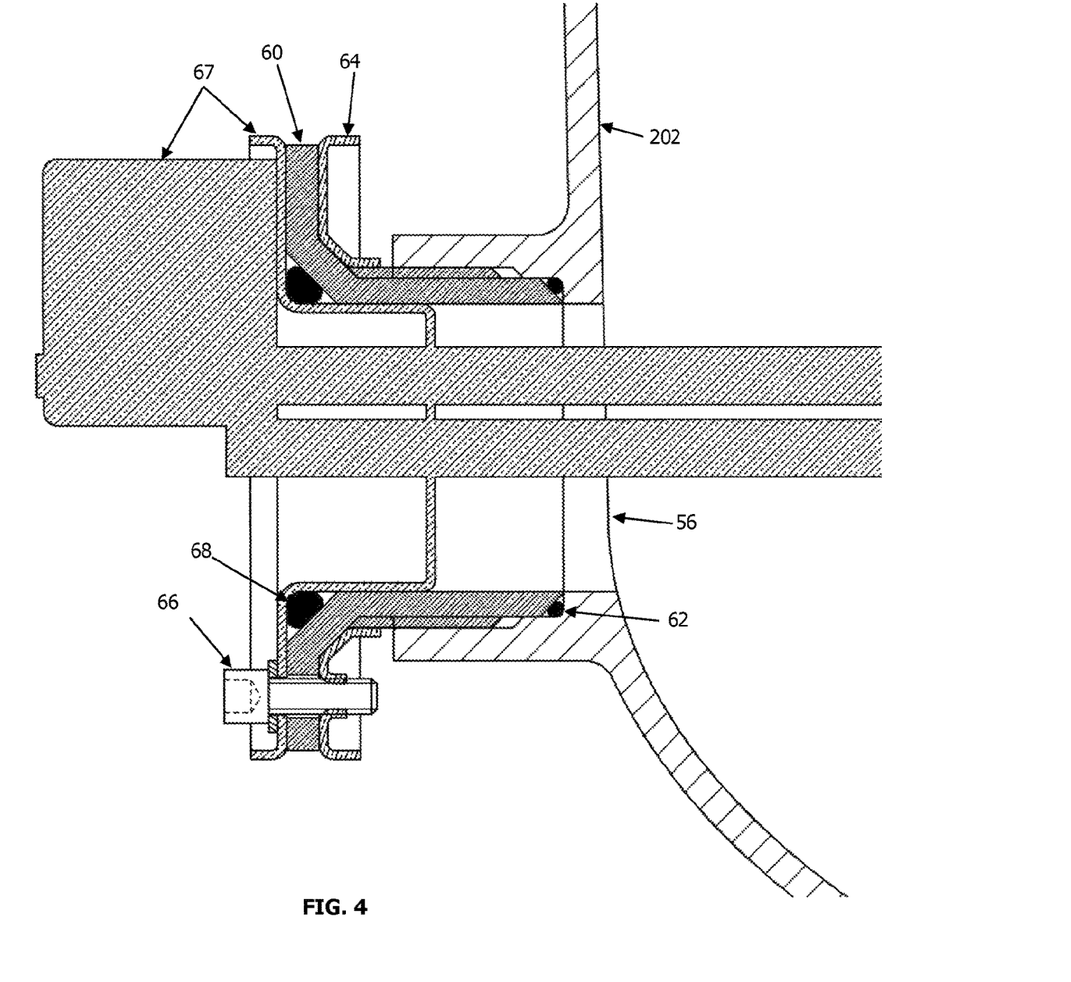
FIG. 4 is a partial cross-sectional view of the hot water storage device of FIG. 1.

An embodiment of the heating element aperture 56 is depicted in greater detail in FIG. 4, in which the heating element aperture 56 is a threaded aperture that is adapted to receive a flanged and threaded mounting component 60, which is preferably moulded from the same or similar fibre reinforced polyphthalamide resin as the first and second sections 100, 200. A heating element assembly 67, typically including a heating element and a thermostat, is secured to the mounting component 60 by means of bolts 66 engaging threaded holes in the mounting plate 64. The mounting plate 64 is preferably made of corrosion resistant steel. A second seal 62, in the form of a self-energising elastomeric seal such as an O-ring, creates a watertight seal between the heating element aperture 56 and the mounting component 60. Unintended relative rotation between the mounting component 60 and the heating element aperture 56 is prevented, preferably by the application of a thread locking sealant to the mating threads between the mounting component 60 and the heating element aperture 56. A third seal 68, in the form of a self-energising elastomeric seal, such as an O-ring, creates a watertight seal between the heating element assembly 67 and the mounting component 60.

During assembly the heating element assembly 67 is secured to the mounting component 60 and the mounting plate 64 using bolts 66. Alternatively, threaded studs may be attached to the mounting plate 64 or the heating element assembly 67 and nuts used in cooperation with the threaded studs to secure the mounting plate 64, the mounting component 60, and the heating element assembly 67 to each other.

The hot water storage device 10 can be produced in a wide array of capacities depending on the intended usage and application. For a typical small domestic hot water system, an embodiment of the hot water storage device 10 is designed to have a capacity of 50 L, with a design corresponding to the embodiment depicted in FIGS. 1 to 4.

The dies required for injection moulding a 50L tank are large and expensive. In an advantageous embodiment of the hot water storage device 10, the first and second sections 100, 200 are designed so that they can be produced using the same moulding die, thereby effectively halving the cost of the moulding dies. In one alternative embodiment, the hot water storage device 10 includes one heating element in the first section 100 and a second, off-peak heating element in the second section 200.

Figure 5:
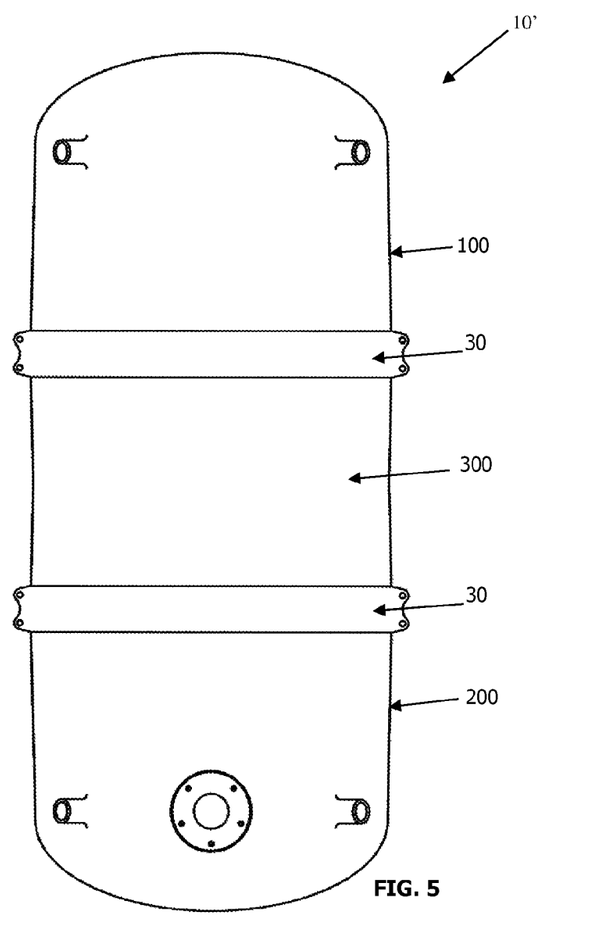
FIGS. 5 and 6 depict alternative embodiments of a hot water storage tank.

For a larger sized hot water storage device 10', as depicted in FIG. 5, a cylindrical third section 300 is arranged between the first section 100 and the second section 200 to produce an elongated version of the hot water storage device 10. In this embodiment, two of the collar connectors 30 are used and each end of the third section 300 is sealingly joined to one of the open ends 104, 204 of the first and second sections 100, 200 in the same manner as the open ends 104, 204 are joined in the smaller hot water storage device 10.

Figure 6:
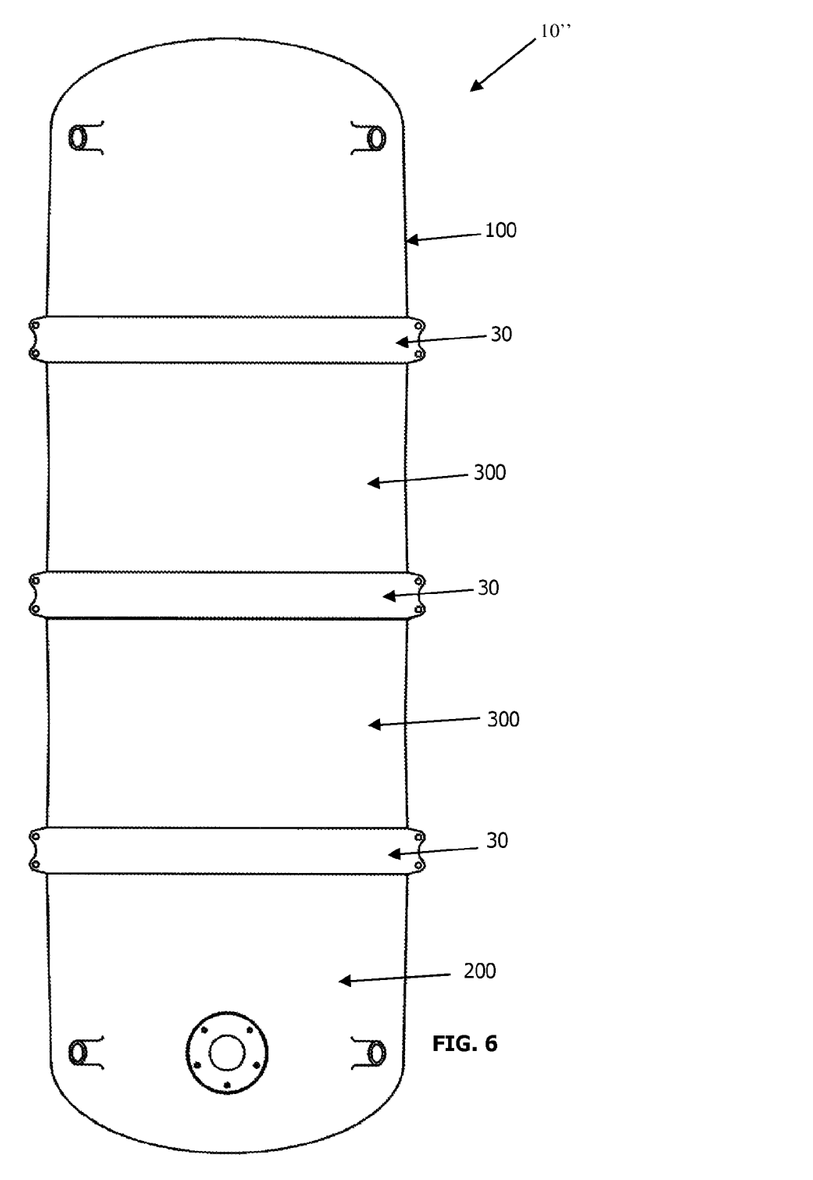

As depicted in FIG. 6, more than one cylindrical section 300 may be inserted between the first section 100 and the second section 200 to produce even larger sizes of hot water storage devices 10". FIG. 6 depicts a hot water storage device 10" comprising two cylindrical sections 300 between the first section 100 and the second section 200, however more than two cylindrical sections 300 may be inserted between the first section 100 and the second section 200, if required. This allows a smaller capacity hot water storage device 10 to be produced using a single first die for the first and second sections 100, 200 and larger capacity hot water storage devices 10', 10" to be produced using the same first die for the first and second sections 100, 200 and a second die for the cylindrical section(s) 300. Minimising the number of dies required to produce a range of different capacity hot water storage devices significantly reduces manufacturing complexity and costs.

If the first and second sections 100, 200 were to be connected using traditional male and female threaded portions, then different dies would be required—one for the section having the male thread and a different one for the section having the female thread. The connection mechanism involving the circumferential ribs 110, 210 of the first and second sections 100, 200 and the circumferential grooves 38 overcomes this problem by allowing both of the first and second sections 100, 200 to be injection moulded using the same die.

Advantageously, the collar connector 30 can be produced in two semi-annular sections using a simple two-part die.

Figure 7:
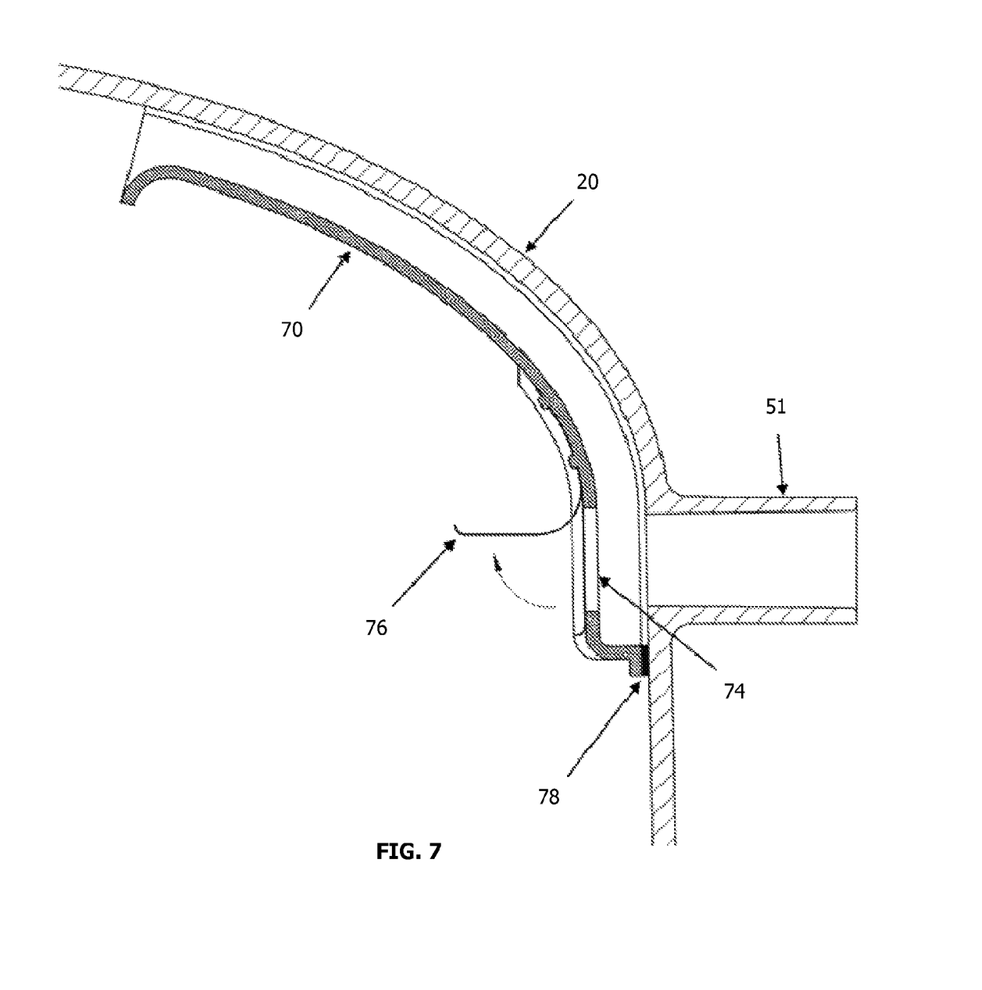
FIG. 7 is a partial cross-sectional view of the hot water storage device of FIG. 1.

As depicted in FIG. 7, an aperture 51 depicted in cross-section can represent either of the valve aperture 50 or the outlet aperture 52 of FIG. 1. The conduit 70 extends from the aperture 51 to a conduit intake opening 72 at the highest internal water level of the hot water storage device 10. By providing the conduit 70 at both the valve aperture 50 and the outlet aperture 52 of FIG. 1, the aperture 51 is interchangeable as either a valve aperture 50 or an outlet aperture 52. The conduit 70 also enables all of the hot water in the hot water storage device 10 to be deliverable through the aperture 51.

In order to allow the aperture 51 to function as a valve aperture 50, a valve opening 74 is provided through the wall of the conduit 70. The valve opening 74 allows a PTR valve to be inserted into the aperture 51 and to extend through the valve opening 74 into the main vessel 20.

When the aperture 51 is not used to accommodate a PTR valve, a resilient corrosion-resistant metal plate 76 closes the valve opening 74, thereby allowing the aperture 51 to act as an outlet aperture 52.

Conduit 70 has a generally flanged "U" shaped cross section. The conduit may be mounted to the main vessel 20 by, for example, attaching the flanges of the conduit 70 to the inner surface of the main vessel 20 using a flexible adhesive 78. The flexible adhesive 78 is ideally sufficiently flexible that it doesn't introduce any significant stress concentrations on the main vessel 20.

In use, the hot water storage devices experience stress in the vessel proportional to both the internal pressure and diameter, with local increases in that stress associated with local geometric complexities of inlets, outlets, heating element apertures, and transition zones between curved surfaces such as at the juncture of the cylindrical bodies 102, 202 and the head portions 106, 206. Under typical operational conditions of cyclical temperature and pressure, peak von Mises stress regions tend to occur at or around the apertures 50, 52, 54, 56 and vary significantly depending on the location of the apertures 50, 52, 54, 56 in the first and second sections 100, 200. If these cyclic peak von Mises stresses fluctuate through a range significantly exceeding 50 MPa, then fatigue cracking failure of the vessel 20 is possible. Therefore, it is important to minimise the peak stresses in the vessel 20.

Under typical operational conditions, a circumferential band shaped region 120, 220 of circumferential membrane compressive stress is located in the body portion 102, 202 proximal to the tangent lines 105, 205 of both the first and second sections 100, 200. It has been discovered that by locating the apertures 50, 52, 54, 56 with centres in these compressive stress regions 120, 220, the tensile stress induced by the apertures is partially offset by the circumferential membrane compressive stress region 120, 220, so resulting in the local von Mises peak stress at the apertures being minimised and maintained below the 50 MPa level. Where necessary, a radius can also be applied to the edge of the aperture where it intersects the inner wall of the vessel 20 to further reduce peak stresses. Minimising these peak stresses using this design allows the hot water storage device 10 to withstand the cyclic operating stresses without suffering fatigue cracking for a long life.

For the 50 L unit, the first and second sections have a height dimension of approximately 320 mm and a maximum outside diameter of approximately 400 mm. The tangent lines 105, 205 are located at a distance of approximately 225 mm from the open ends 104, 204. The apertures 50, 52, 54, 56 are provided at a centre distance of approximately 215 mm from the open ends 104, 204, being within about 10 mm of the tangent lines 105, 205. The ratio of the distance between the open ends 104, 204 and the centre of the apertures 50, 52, 54, 56 and the distance between the open ends 104, 204 and the tangent lines 105, 205 is approximately between 0.94 and 0.97. Preferably, this ratio is not less than 0.90.

The hot water storage device of the present disclosure has the advantage that it is simple and efficient to manufacture and assemble. The modular design of the present water storage device allows different capacity devices to be manufactured from a small number of dies. As a result, when manufactured in bulk, the hot water storage devices of the present disclosure can be produced at less cost than an equivalent size conventional steel hot water tank.

The hot water storage device of the present disclosure is not prone to corrosion and is far more durable than a conventional steel hot water tank. Consequently, units do not need to be replaced as often as conventional hot water tanks, resulting in lower ongoing costs to consumers and less waste, further enhancing its environmental credentials.

The hot water storage device of the present disclosure weighs much less than a conventional steel hot water tank. This results in significant cost savings in terms of shipping/transport and allows the units to be easily handled and installed by a single technician, reducing the cost of installation.

INDUSTRIAL APPLICABILITY

The arrangements described are applicable to the commercial and domestic hot water heater industries.

The foregoing describes only some embodiments of the present invention, and modifications and/or changes can be made thereto without departing from the scope and spirit of the invention, the embodiments being illustrative and not restrictive.

In the context of this specification, the word "comprising" and its associated grammatical constructions mean "including principally but not necessarily solely" or "having" or "including", and not "consisting only of". Variations of the word "comprising", such as "comprise" and "comprises" have correspondingly varied meanings.

As used throughout this specification, unless otherwise specified, the use of ordinal adjectives "first", "second", "third", "fourth", etc., to describe common or related objects, indicates that reference is being made to different instances of those common or related objects, and is not intended to imply that the objects so described must be provided or positioned in a given order or sequence, either temporally, spatially, in ranking, or in any other manner.

Although the invention has been described with reference to specific examples, it will be appreciated by those skilled in the art that the invention may be embodied in many other forms.

The invention claimed is:

1. A hot water storage device having a vessel comprising:
a first section formed from a moulded material; and
a second section formed from a moulded material,
wherein an open end of the first section is sealingly engaged with an opposing open end of the second section to form the vessel,
wherein the first and second sections each have a generally cylindrical body portion and a closed end comprising a head portion,
wherein the vessel includes a water inlet aperture moulded into the first or second section and a water outlet aperture moulded into the first or second section and wherein the inlet and outlet apertures are located on the body portion proximal to a tangent line between the body portion and the head portion, and
wherein for each aperture, a ratio of a distance between a centre of the aperture and the open ends and a distance between the tangent line and the open ends is not less than 0.90.

2. The hot water storage device of claim 1, wherein each of the apertures is centred in a circumferential region of the respective first or second section that is subject to circumferential compressive membrane stress under typical operational conditions of cyclical temperature and pressure.

3. The hot water storage device of claim 1, wherein the ratio is between 0.94 and 0.97.

4. The hot water storage device of claim 1, wherein an annular elastomeric seal is arranged between the opposing open ends.

5. The hot water storage device of claim 1, wherein at least one aperture is connected to an internal conduit having an intake opening at a location above the at least one aperture.

6. The hot water storage device of claim 5, wherein the internal conduit has a valve opening generally aligned with the at least one aperture, allowing the at least one aperture to receive a valve, the valve opening having a resiliently deformable closure, adapted to close the valve opening when the at least one aperture is not used to receive a valve.

7. The hot water storage device of claim 1, wherein the first section and second section are maintained in sealing engagement by a collar connector that clamps the opposing open ends of the first and second sections together.

8. The hot water storage device of claim 7 wherein:
the first section has one or more radially outwardly projecting ribs proximal to the open end of the first section;
the second section has one or more radially outwardly projecting ribs proximal to the open end of the second section; and
the collar connector has a corresponding groove adapted to receive each rib, when the collar connector clamps onto the opposing open ends.

9. The hot water storage device of claim 8, wherein the grooves in the collar connector and/or the ribs of the first and second sections are tapered such that as the collar connector tightens around the opposing open ends and the ribs are pressed into the grooves, the opposing open ends are compressed together.

10. The hot water storage device of claim 7, wherein the collar connector is formed from the same fibre reinforced polyphthalamide resin as the first and second sections.

11. The hot water storage device of claim 7, wherein the collar connector is formed from two semi-annular halves joined by at least one fastener to fasten the collar connector around the opposing open ends.

12. The hot water storage device of claim 11, wherein the at least one fastener comprises one or more bolts.

13. The hot water storage device of claim 1, wherein the first section is formed from a moulded fibre reinforced polyphthalamide resin and the second section is formed from a moulded fibre reinforced polyphthalamide resin.

14. The hot water storage device of claim 13, wherein the fibre reinforced polyphthalamide resin contains glass fibres.

15. The hot water storage device of claim 13, wherein the polyphthalamide resin is formed from a mixture of hexamethylene diamine, 2-methyl pentamethylene diamine and terephthalic acid.

16. A hot water system comprising:
a water heating device;
a hot water storage device according to claim 1;
water inlet pipework in fluid communication with the storage device; and
water outlet pipework in fluid communication with the storage device.

17. A hot water storage device having a vessel comprising:
a first section formed from a moulded material; and
a second section formed from a moulded material,
wherein an open end of the first section is sealingly engaged with an opposing open end of the second section to form the vessel,
wherein the first and second sections each have a generally cylindrical body portion and a closed end comprising a head portion,
wherein the vessel includes a water inlet aperture moulded into the first or second section and a water outlet aperture moulded into the first or second section and wherein the inlet and outlet apertures are located on the body portion proximal to a tangent line between the body portion and the head portion, and
wherein a heating element aperture is provided in either the first section or the second section, the heating element aperture being threaded and adapted to receive a flanged and threaded mounting component and a heating element assembly mounted to the mounting component, the heating element assembly having a heating element that extends into the vessel for heating water in the vessel.

18. A hot water storage device having a vessel comprising:
a first section formed from a moulded material;
a second section formed from a moulded material; and
one or more third sections formed from a moulded material,
wherein the first and second sections each have a generally cylindrical body portion and a closed end comprising a head portion and the one or more third portions are generally cylindrical having two open ends, wherein the one or more third sections are arranged axially between the first section and the second section, with the open ends of adjacent sections being sealingly engaged to form the vessel, wherein the vessel includes a water inlet aperture moulded into the first or second section and a water outlet aperture moulded into the first or second section and wherein the inlet and outlet apertures are located on the body portion proximal to a tangent line between the body portion and the head portion, and wherein, for each aperture, a ratio of a distance between a centre of the aperture and the open ends and a distance between the tangent line and the open ends is not less than 0.90.

\* \* \* \* \*